Jan. 26, 1954
A. W. GARDES
2,667,273
MANIFOLD FOR CLARIFIER INTAKES
Filed Dec. 23, 1950
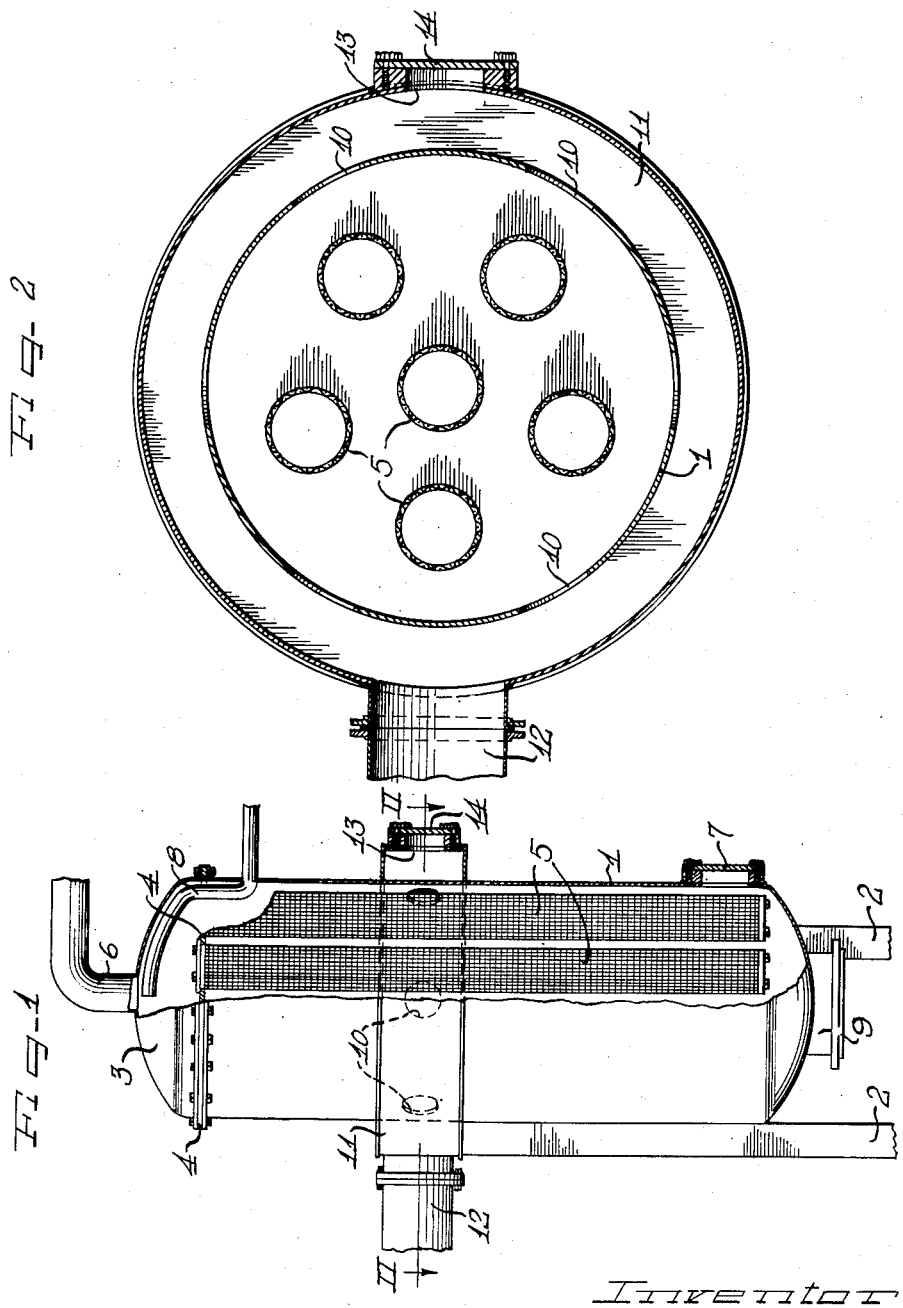
Inventor
Alfred W. Gardes Patented Jan. 26, 1954

2,667,273

UNITED STATES PATENT OFFICE 2,667,273

MANIFOLD FOR CLARIFIER INTAKES

Alfred W. Gardes, Detroit, Mich., assignor to Honan-Crane Corporation, Lebanon, Ind., a corporation of Indiana Application December 23, 1950, Serial No. 202,538

2 Claims. (Cl. 210—184)

This invention relates to improvements in a manifold for clarifier intakes, and more particularly to a manifold intake arrangement for clarifiers used to purify various fluids, the invention being highly desirable for use in connection with clarifiers designed to filter coolants, oils, and the like, under pressure, although the invention will have other uses and purposes as will be apparent to one skilled in the art.

In the past, various forms of filtering apparatus have been provided, and in one form of this apparatus, especially a clarifier for the filtering or purifying of coolants, and similar fluids, a tank was provided to receive filtrable fluid or coolant under pressure. This tank contains a plurality of individual tubular screens through which the fluid must pass. A vertical manifold was provided on the wall of the tank to introduce the filtrable fluid under pressure, and since this manifold together with a diffuser inside of it was located only at one point on the circumference or perimeter of the tank, there was an unequal distribution of filtrable fluid, and all of the filter screens did not carry an equal proportion of the load. Further, the manifold being welded to the tank in a vertical direction at the sides thereof was subject to the relatively high pressure in a lateral direction, the tank itself tended to bulge, and the welds on the manifold loosened, resulting in leakage. Such an arrangement causes extensive repair costs at various times.

With the foregoing in mind, it is an important object of the instant invention to provide a manifold intake arrangement for filtering apparatus, wherein the manifold and the portion of the tank with which it is associated are so constructed as to insure an even distribution of filtrable fluid over the cross section of the tank.

It is a further object of the invention to provide a manifold intake arrangement for a filtering apparatus embodying a tank to receive filtrable fluid under pressure, wherein the manifold is so arranged as to not only effect an even distribution of the filtrable fluid inside the tank, but also to reenforce the tank itself.

Still a further feature of the invention resides in the provision of a manifold for association with a tank to receive filtrable fluid under pressure, and in which the tank contains various individual filtering elements, with the manifold circumscribing the tank and having a cross sectional area less than that of an intake pipe connected to the manifold, whereby the manifold insures an equalization of the load of filtrable fluid and causes each screen to assume its proportionate share of that load.

It is also an object of this invention to provide a manifold arrangement for a tank containing filtering means and which tank receives filtrable fluid under pressure, which arrangement is so constructed as to not only reenforce the tank, equalize the load of filtrable fluid to the filtering means, but also insure each separate filtering means taking on its full share of the work.

Still a further feature of the invention resides in the provision of an economical manifold arrangement to admit filtrable fluid to a tank containing filtering means, which manifold arrangement also has at least one clean-out opening therein normally covered by a removable cap.

It is also a feature of the invention to provide a manifold intake arrangement for a filter apparatus embodying a tank containing a number of elongated screens, the tank having a transverse series of spaced openings therearound intermediately the length of the screens, and the manifold arrangement including a channel-like manifold secured firmly to the tank on both sides the series of openings to admit filtrable fluid through those openings into the tank.

While some of the more salient features, characteristics and advantages of the instant invention have been above pointed out, others will become apparent from the following disclosures, taken in conjunction with the accompanying drawing, in which—

Figure 1 is a fragmentary elevational view of a clarifying apparatus equipped with manifold intake means embodying principles of the present invention, parts being broken away and parts being shown in section in order to better present the entire structure; and Figure 2 is an enlarged fragmentary vertical sectional view taken substantially as indicated by the line II—II of Fig. 1, looking in the direction of the arrows.

As shown on the drawings:

The illustrated embodiment of the instant invention is shown, by way of example, with a clarifying apparatus of the character used heretofore for the purification of coolants employed with cutting and grinding machines. This clarifying apparatus embodies a tank or housing I mounted on any suitable form of support, such as indicated rather diagrammatically by legs 2. The tank is provided with a cover 3 bolted to the body of the tank, and clamped between the cover and body flanges is a screen supporting plate 4.

Depending from the screen supporting plate 4 is a plurality of elongated tubular screen assemblies 5, there being any desirable number of such assemblies depending upon the capacity desired from the particular apparatus. A filtrable fluid travels laterally into each tubular screen assembly, and the filtrate emanates through the open upper end of each assembly above the supporting plate 4, into the space between that plate and the cover 2, from which the filtrate exits back to the cutting or grinding machine through an outlet pipe 6. At the lower end of the tank an inspection port having a removable cap as indicated at 7 may be provided in the tank to ascertain the condition of the screens after usage.

At periodic intervals, the screens are cleansed by reverse pressure, causing the filtrate above the plate 4 to be forced downwardly and backwardly through the screens to release the accumulation on the external surface of the screens. This operation is commonly termed blowback and may be caused by sudden pneumatic pressure entering through a pipe 8, it being understood that at this time the entrance of filtrable fluid into the tank is shut off. The blowback and the accumulation from the screens is discharged at the bottom of the tank through a pipe 9 which is connected to the collection tank for contaminated fluid.

The present invention centers itself in the manifold arrangement by which filtrable fluid is admitted to the tank. To this end, the tank itself is provided with a transverse series of equally spaced apertures 10 in the wall thereof. Covering these apertures is a channel-shaped manifold 11, the manifold circumscribing the tank in a relatively intimate fit and preferably being welded or equivalently secured to the tank on each side of the series of apertures. In short, the manifold is channel-like in shape with the tank itself, except for the apertures 10 functioning to close the open side of the channel. An intake pipe 12 connected to the manifold admits contaminated fluid to the manifold for distribution into the tank through the opening 10.

As seen clearly in Figs. 1 and 2, it will be noted that the cross sectional area of the intake pipe 12 is preferably greater than the cross sectional area of the manifold 11 so as to insure the contaminated fluid traveling entirely around the manifold rather than most of the fluid entering the tank through the nearest openings 10. Thus an even distribution of fluid is caused, and the filter screen assemblies 5 farthest from the intake pipe 12 are called upon to do their full share of the work.

At the same time, it will be especially noted that by virtue of the manifold circumscribing the tank, and being securely affixed thereto, the manifold actually reenforces the tank against the pressure of the entering fluid, and the arrangement of the manifold causes an equalization of the load.

Preferably at a point remote from the intake part 12 the manifold is provided with a clean-out opening 13 normally covered by a removable cap 14. Through this opening, any solids, debris, or other settlings accumulated in the manifold may be periodically removed.

It will also be noted that the series of openings 10 and the manifold are located intermediate the ends of the screen assembly so that the filtrable fluid enters the tank somewhat centrally thereof. Preferably, as illustrated, the fluid entrance ports 10 are slightly above the exact center, to compensate for the effect of gravity on the entering fluid, so as to insure substantially the entire surface of each screen assembly performing a filtering function.

It will further be appreciated that my novel manifold assembly is very economical to produce and install during manufacture, and is highly durable, in addition to the other advantages mentioned hereinabove.

It will be understood that modifications and variations may be effected without departing from the scope of the novel concepts of the present invention.

I claim as my invention:

1. In a liquid clarifying apparatus, a tank having an outlet for filtrate, filtering means in said tank, said tank having a circumferential series of spaced inlet openings in an intermediate location of the side wall, a manifold in the form of an inwardly open three-sided channel with the of radial side edges fixedly secured to said tank on each side of said series of inlet openings to admit contaminated liquid under pressure to said openings and reinforce said tank against expansion, an inlet pipe connected to the outer side of said manifold, and the inner open end of said pipe being opposite a wall portion of said tank between openings in said series which wall portion is solid the full width of said manifold.

2. In a liquid clarifying apparatus, a tank having an outlet for filtrate, filtering means in said tank, said tank having a circumferential series of spaced inlet openings in an intermediate location of the side wall, a manifold in the form of an inwardly open channel fixedly secured to said tank on each side of said series of inlet openings to admit contaminated liquid under pressure to said openings and reinforce said tank against expansion, an inlet pipe connected to said manifold, and the inner open end of said pipe being opposite a wall portion of said tank between openings in said series, said inlet pipe discharging radially into said manifold and having a greater cross-sectional area than said manifold to further insure an even distribution of incoming liquid to said opening.

ALFRED W. GARDES.

References Cited in the file of this patent

UNITED STATES PATENTS

| Number | Name | Date |
|---|---|---|
| 518,238 | Fullner | Apr. 17, 1894 |
| 582,400 | Stifel | May 11, 1897 |
| 1,823,171 | Hele-Shaw et al. | Sept. 15, 1931 |
| 1,908,102 | Arledter | May 9, 1933 |
| 2,304,248 | Entwistle et al. | Dec. 8, 1942 |
| 2,405,838 | Lawson et al. | Aug. 13, 1946 |

FOREIGN PATENTS

| Number | Country | Date |
|---|---|---|
| 1,882/26 | Australia | May 17, 1926 |